United States Patent Office 2,758,990
Patented Aug. 14, 1956

2,758,990

ALKALI LIGNIN CONDENSATE WITH POLYHYDROXYBENZENE

Paul Lipsitz, Wilmington, Del., assignor to E. I. du Pont de Nemours and Company, Wilmington, Del., a corporation of Delaware No Drawing. Application November 13, 1951, Serial No. 256,120

8 Claims. (Cl. 260—124)

This invention relates to new tanning agents and more particularly to new water-soluble lignin derivatives which are useful in the tanning of leather.

The United States is dependent to a large degree upon imports for its supply of vegetable tanning materials, such as extracts of quebracho and divi-divi. As a result, the supply of natural tanning agents is subject to uncertainty and their prices fluctuate widely. Efforts have been made to provide a suitable domestic supply of such materials, both by attempts to grow tannin-containing plants and by attempts to synthesize tanning agents by chemical methods. At the present time, it has not been demonstrated that tannin-containing plants can be grown economically in this country, nor have synthetic tanning agents been developed which are successful on a commercial scale. The failure of the synthetic agents to compete successfully with natural tannins is due in large part to the relatively high cost of the synthetics and also in part to their poor quality.

It has been found heretofore that synthetic tanning agents may be prepared by the chemical modification of lignin, which is obtained as a by-product of the cellulose industry. Water-soluble lignosulfonates which are contained in sulfite waste liquor from the sulfite process of paper pulp production may be modified chemically to yield water-soluble materials having tanning properties, as described in J. Am. Leather Chem. Assoc. 43, 307 (1948). These products fall somewhat short of the desirable tanning properties possessed by the natural tanning agents.

It is an object of this invention to provide new synthetic tanning agents which are relatively inexpensive and which are highly effective in the tanning of leather. A further object is to provide a process by which these materials may be prepared from the waste products of the paper industry. Further objects will appear from the detailed description of this invention which follows.

The new tanning agents of this invention are water-soluble condensation products formed from the sodium salt of alkali lignin and a polyhydroxybenzene containing from two to three hydroxyl groups attached to the aromatic nucleus. They are prepared by heating the reactants together at a temperature of from 100 to 180° C. A preferred product is the condensation product of the sodium salt of alkali lignin and resorcinol.

The structure of lignin is not completely known, but it is generally considered to be a macromolecular condensation product having a complicated fundamental unit which has a molecular weight of from 800 to 1000. The lignin molecule contains aromatic nuclei and also furane or pyrane rings. It is also known to contain a relatively large number of methoxyl groups and a smaller number of hydroxyl groups of alcoholic and phenolic nature.

The term "alkali lignin" describes the lignin obtained from the black liquor which is derived in the soda and sulfate processes of paper pulp manufacture. The use of the word alkali here refers to the method by which the lignin is extracted from the wood or other cellulosic raw material and does not imply that the product is an alkali salt. The product is ordinarily separated from the black liquor by acid precipitation. Alkali lignin is a brown powder which is insoluble in water but soluble in strong alkali. It contains no sulfonic acid groups such as are present in the lignosulfonate which is obtained from the sulfite process of pulp manufacture. Alkali lignin may either be derived from softwood, i. e., the wood from coniferous trees, or from hardwood, i. e., wood from deciduous trees. Alkali lignin may also be obtained by the extraction of corn cobs, flax shives, oat hulls, cottonseed hulls and bagasse.

The sodium salt of alkali lignin is a brown, free-flowing, amorphous powder that is soluble in water. It contains about two sodium atoms per molecule of alkali lignin. The process of this invention is operable if other alkali metals such as potassium are used in place of sodium, but in view of their higher cost, there is no advantage in their substitution.

The polyhydroxybenzenes which may be used to react with the sodium salt of alkali lignin are those which contain from two to three hydroxyl groups attached to the aromatic nucleus, and include resorcinol, catechol, hydroquinone, pyrogallol, hydroxyhydroquinone and phloroglucinol. Various substituents which do not influence the reaction may be present, such as halogen and lower alkyl radicals. Examples of such substituted compounds are orcinol, methylphloroglucinol and 4-chlororesorcinol. Mixtures of such polyhydroxybenzenes with one another or with minor amounts of monohydroxybenzenes such as phenol may also be used.

In preparing the new tanning agents of this invention, it is preferred to employ from one to four moles of the polyhydroxybenzene for each two moles of the sodium salt of alkali lignin, calculated on the basis of a molecular weight of from 800 to 1000 for the latter compound. With smaller amounts of the polyhydroxybenzene, the products are deficient in tanning properties. On the other hand, as larger amounts of the polyhydroxybenzene are used, the product becomes increasingly expensive. As the tanning properties are not improved correspondingly when the molar ratio exceeds 2:1, there is no advantage in going beyond this ratio.

The condensation may be carried out by heating the polyhydroxybenzene with a pre-formed sodium salt of alkali lignin, or there may be used a mixture of the polyhydroxybenzene, alkali lignin (not the sodium salt) and sodium hydroxide. In the latter case, the sodium salt of alkali lignin is formed in situ, concurrently with its reaction with the polyhydroxybenzene. When this procedure is followed, it is desirable to use from 2.8 to 4.6 moles of sodium hydroxide for each two moles of alkali lignin, calculated on the basis of a molecular weight of from 800 to 1000. If larger amounts of sodium hydroxide are used, the resulting tanning agent is apt to damage the leather. If less sodium hydroxide is used, the product has lower water solubility and is less effective as a tanning agent.

Suitable tanning agents are not obtained by heating together the dry sodium salt of the polyhydroxybenzene and alkali lignin (not the sodium salt), or by first condensing alkali lignin with a ployhydroxybenzene and thereafter solubilizing the product with sodium hydroxide. To obtain the useful products of this invention, it is necessary either that the sodium hydroxide be reacted with the alkali lignin before the addition of the polyhydroxybenzene, or that it be available for reaction with the alkali lignin while the condensation with the polyhydroxybenzene is proceeding.

The condensation may be carried out using an intimate dry mixture of the ingredients or using a mixture of the reactants in a liquid medium, especially in water. The reaction temperature is preferably maintained between 100 and 180° C., since below this range the reaction is impractically slow, and above it lignin begins to decompose. The reaction may be carried out at atmospheric pressure or at moderate superatmospheric pressure, such as is developed autogenically in a closed reaction vessel. The time required for reaction will vary depending on the degree of subdivision of the reactants, the intimacy of the mixture, and the temperature used. Heating times of from one to ten hours have been found satisfactory in many cases, though shorter or longer times may be used.

The products of this invention are quite soluble in water, giving 30% aqueous solutions at room temperature and concentrations up to 50% at higher temperatures. These agents may be used to tan various types of leather such as soft garment leather, inside sole leather, sole leather, belting leather and the like. They may be used as a retan after conventional chrome tanning or after tanning with other synthetic agents such as an aliphatic sulfonyl chloride. They may also be used in admixture with the vegetable extracts traditionally used in the tanning of leather.

The effectiveness of a tanning agent is determined by evaluating the quality of the leather which may be produced with it. Although leather has many characteristic properties which may be measured, the two most common methods of evaluating are to determine its "feel" and its shrinkage temperature. Leather "feel" depends upon such factors as flexibility, fullness, temper and grain character. Leather of good quality is flexible and full, with a good temper, in contrast to poor leather which is usually flat and stiff. The shrinkage temperature is a measure of the degree of tanning and depends upon the resistance of the leather to the action of hot water. It is determined by placing the leather in cool water, gradually heating the water, and noting the temperature at which the leather suddenly begins to shrink. Raw skin ordinarily has a shrinkage temperature of 63 to 67° C. A leather which has been properly tanned with a vegetable tanning agent has a shrinkage temperature of from 75 to 85° C. As shown in the illustrative examples which follow, the new synthetic tanning agents prepared according to this invention may be used to produce leather having shrinkage temperatures which are also in this range.

*Example 1*

The tanning procedure used in evaluating the agents prepared according to the subsequent examples is as follows: A piece of air-dried, depickled, defatted, and dehydrated calfskin is soaked in water for 30 minutes in order to rehydrate it and bring it to the condition of freshly depickled calfskin. A solution of the tanning agent is prepared by dissolving 6 parts in 100 parts of water. The skin is immersed in this solution and drummed overnight, a period of 12 to 16 hours, at 40° C. The hide substance and lignin tanning agent are used in a 1:1 weight ratio. Penetration is always complete at the end of this time and the pH of the solution is from 8 to 8.5. Acetic acid is added at 15 minutes drumming intervals to bring the pH down stepwise to 3.5. Formic acid, sulfuric acid, hydroxacetic acid, and other acids may be used as well as acetic acid for this pH reduction. The leather is removed from the tanning solution after tumbling at pH 3.5 for 30 minutes. It is washed by tumbling for 10 minutes with two 100 part portions of water, and then fat-liquored with an aqueous emulsion of equal parts of cod oil and sulfonated cod oil. After allowing the leather to air-dry at room temperature it is examined and tested for leather quality.

*Example 2*

An intimate mixture of 42 parts of the sodium salt of alkali lignin (softwood) and 11 parts of resorcinol is placed in a stainless steel bomb and heated at 130±5° C. for 10 hours. The dark brown, brittle solid is removed, powdered, and used to convert skin into leather.

The resulting tanned leather is light brown in color, has excellent fullness, good temper and grain, and has a shrinkage temperature of 83° C.

*Example 3*

Forty-two (42) parts of the sodium salt of alkali lignin (softwood) and 5.5 parts of resorcinol are condensed in a bomb as described in Example 2. This product produces leather having good temper, good fullness, an excellent grain and a shrinkage temperature of 81° C.

*Example 4*

Forty-two (42) parts of the sodium salt of alkali lignin (softwood) and 2.8 parts of resorcinol are reacted as described in Example 2. The leather obtained with this product has only a fair quality, the temper being stiff and the color dark.

*Example 5*

An intimate mixture of 420 parts of the sodium salt of alkali lignin (softwood) and 65 parts of resorcinol is reacted by placing it in a stainless steel autoclave and heating, with agitation, at 130°±5° C. for 5 hours. The brown, brittle solid obtained is employed as a tanning agent and yields a full leather similar to that obtained from the product described in Example 3.

*Example 6*

Twelve (12) parts of a 1:1 molar mixture of the sodium salt of alkali lignin (softwood), taken as having a molecular weight of 840, and resorcinol are dissolved in 200 parts of water and refluxed for 27 hours. The solution is used directly to convert a piece of calfskin into an excellent, full leather having a shrinkage temperature of 81° C.

*Example 7*

Forty-two (42) parts of the sodium salt of alkali lignin (softwood) and 11 parts of catechol are reacted as in Example 2. Leather having a shrinkage temperature of 73° C. is obtained.

*Example 8*

Forty-two (42) parts of the sodium salt of alkali lignin (softwood) and 11 parts of hydroquinone are reacted as in Example 2. The leather obtained by tannage with this product has a shrinkage temperature of 78° C.

*Example 9*

Forty-two (42) parts of the sodium salt of alkali lignin (softwood) and 12.6 parts of phloroglucinol are reacted as in Example 2. Leather obtained by tannage with this product has fair fullness, is firm and has a shrinkage temperature of 77° C.

*Example 10*

Forty-two (42) parts of the sodium salt of alkali lignin (softwood) and 6.5 parts of 4-chlororesorcinol are reacted as described in Example 2. Leather obtained by tannage with this material is firm and has a shrinkage temperature of 81° C.

*Example 11*

An intimate mixture of 126 parts of the sodium salt of alkali lignin (softwood) and 19.5 parts of resorcinol is placed in a one-quart rotary drum, open to the atmosphere. The drum is rotated, and the temperature is brought to 130° C. and held for 5 hours. After cooling, the product is removed and is used to convert calfskin into an excellent leather having a shrinkage temperature of 80° C.

*Example 12*

One hundred twenty-six (126) parts of the sodium salt of alkali lignin (softwood) are slurried in 300 parts of water, 19.5 parts of resorcinol are added, and the mixture is brought to reflux temperature. The reagents dissolve completely and after 15 hours reflux time, the viscous solution is poured into pans and dried under vacuum at 50–55° C. for 16 hours. The black, brittle material obtained produces a good leather which has a shrinkage temperature of 75° C.

*Example 13*

A mixture of 42 parts of the sodium salt of alkali lignin (softwood) and 5.5 parts of resorcinol are reacted as in Example 2. After a reaction time of one hour, the product is removed. Calfskin tanned with this product has good fullness, good temper, and a shrinkage temperature of 76° C.

*Example 14*

A mixture of 42 parts of the sodium salt of alkali lignin (softwood) and 6.5 parts of resorcinol is reacted in a bomb as in Example 2 for 10 hours at 100° C. The product obtained makes leather with a shrinkage temperature of 82° C.

*Example 15*

Forty-two (42) parts of the sodium salt of alkali lignin (softwood) and 6.5 parts of resorcinol are reacted in a steel bomb for one hour at 175° C. The product makes leather having a shrinkage temperature of 81° C.

*Example 16*

Forty-two (42) parts of the sodium salt of alkali lignin (softwood) are reacted with 7 parts of methylphloroglucinol by the procedure described in Example 2. Tannage with this product produces a very good leather having excellent "feel" characteristics and a shrinkage temperature of 72° C.

*Example 17*

Forty-two (42) parts of the sodium salt of alkali lignin (softwood), 5.5 parts of resorcinol, and 4.7 parts of phenol are reacted as described in Example 2. The leather obtained by tannage with this product gives a good leather having a shrinkage temperature of 81° C.

*Example 18*

Alkali lignin from hardwood is converted to its sodium salt by adding 122 g. of the hardwood alkali lignin to an aqueous solution of 10 g. sodium hydroxide in 500 ml. of water at 80–85° C. The solution is filtered and evaporated to dryness.

Forty-two (42) parts of this sodium salt of alkali lignin (hardwood) are reacted with 6.5 parts of resorcinol by the process of Example 2. Tannage with the resulting product produces an excellent leather with a shrinkage temperature of 80° C.

*Example 19*

Forty-two (42) parts of alkali softwood lignin, 6.5 parts of crude resorcinol and 5 parts of NaOH are intimately mixed and reacted in a bomb at 130° C. for 5 hours. Leather produced according to Example 1 with this material has good "feel" and a shrinkage temperature of 76° C.

*Example 20*

Alkali softwood lignin (42 parts), resorcinol (6.5 parts) and NaOH (4 parts) are reacted as in Example 19. Leather made according to Example 1 with the product has a very good "feel" and a shrinkage temperature of 77° C.

*Example 21*

Alkali softwood lignin (42 parts), resorcinol (6.5 parts) and NaOH (3 parts) are reacted as in Example 19. The leather made according to Example 1 from the product has a shrinkage temperature of 78° C.

*Example 22*

A mechanical mixture of the sodium salt of alkali softwood lignin (42 parts), and resorcinol (6.5 parts) is used in the tanning procedure described in Example 1. The leather obtained is quite stiff and shows only a very slight increase in shrinkage temperature over the untanned skin.

*Example 23*

Two hundred ten (210) parts of the sodium salt of alkali softwood lignin and 33 parts of resorcinol are dissolved in 500 parts of water and the reaction mass held at reflux temperature. At time intervals of 1, 3, 7, 10 and 12 hours, samples are removed from the reaction flask, dried in vacuum at 75° C., and used to convert skin into leather by the procedure of Example 1. All samples produce leather with good "feel" characteristics. No significant differences are apparent among the various samples.

The products of this invention have the advantage over the natural vegetable tannins of being prepared from inexpensive raw materials which are available in large quantities domestically. Being manufactured chemicals, they are susceptible to close control of quality and need not vary in tanning strength from batch to batch to the same extent as do the natural materials. Because of their high water-solubility, the products of this invention are well suited to be substituted for the natural tannins in the ordinary commercial tannage systems in which aqueous media are employed.

I claim:

1. The process of preparing a water-soluble condensation product of the sodium salt of alkali lignin and a polyhydroxybenzene containing from two to three hydroxyl groups attached to the benzene nucleus which comprises heating together at a temperature of from 100 to 180° C. two moles of the sodium salt of alkali lignin, calculated on the basis of a molecular weight of from 800 to 1000, and from one to four moles of the polyhydroxybenzene.

2. A process according to claim 1 in which the polyhydroxybenzene is resorcinol.

3. A process according to claim 1 in which the sodium salt of alkali lignin is prepared in situ, concurrently with its reaction with the polyhydroxybenzene, by the reaction of two moles of alkali lignin with from 2.8 to 4.6 moles of sodium hydroxide.

4. A process according to claim 3 in which the polyhydroxybenzene is resorcinol.

5. A process according to claim 1 in which the reaction is carried out by heating in intimate dry mixture of the reactants.

6. A water-soluble condensation product of the sodium salt of alkali lignin and a polyhydroxybenzene containing from two to three hydroxy groups attached to the benzene nucleus, which is obtained by the reaction at a temperature of from 100 to 180° C. of two moles of the sodium salt of alkali lignin, calculated on the basis of a molecular weight of from 800 to 1000, and from one to four moles of the polyhydroxybenzene.

7. A product according to claim 6 in which the polyhydroxybenzene is resorcinol.

8. A water-soluble condensation product of the sodium salt of alkali lignin and a polyhydroxybenzene containing from two to three hydroxy groups attached to the benzene nucleus, which is obtained by the reaction at a temperature of from 100 to 180° C. of a mixture of two moles of alkali lignin, calculated on the basis of a molecular weight of from 800 to 1000, 2.8 to 4.6 moles of sodium hydroxide, and from one to four moles of the polyhydroxybenzene.

References Cited in the file of this patent

UNITED STATES PATENTS

| | | |
|---|---|---|
| 1,539,517 | Schmidt | May 26, 1925 |
| 2,168,160 | Hochwalt et al. | Aug. 1, 1939 |
| 2,578,695 | Goss | Dec. 18, 1951 |
| 2,597,809 | Miglarese | May 20, 1952 |
| 2,600,606 | Balon | June 17, 1952 |